United States Patent
Twitchett et al.

(10) Patent No.: US 10,013,000 B2
(45) Date of Patent: Jul. 3, 2018

(54) SANITARY INSERTION UNIT

(71) Applicant: Neoperl GmbH, Mullheim (DE)

(72) Inventors: Simon Twitchett, Kidderminster (GB); Alexander Stein, Ihringen (DE)

(73) Assignee: Neoperl GmbH, Müllheim (DE)

( * ) Notice: Subject to any disclaimer, the term of this patent is extended or adjusted under 35 U.S.C. 154(b) by 50 days.

(21) Appl. No.: 15/312,934

(22) PCT Filed: Jan. 26, 2016

(86) PCT No.: PCT/EP2016/000134
§ 371 (c)(1),
(2) Date: Nov. 21, 2016

(87) PCT Pub. No.: WO2016/142023
PCT Pub. Date: Sep. 15, 2016

(65) Prior Publication Data
US 2017/0185090 A1  Jun. 29, 2017

(30) Foreign Application Priority Data

Mar. 9, 2015  (DE) .................... 20 2015 001 885 U

(51) Int. Cl.
*E03C 1/08*  (2006.01)
*G05D 7/01*  (2006.01)
(Continued)

(52) U.S. Cl.
CPC ........... *G05D 7/012* (2013.01); *B05B 1/3006* (2013.01); *B05B 12/088* (2013.01); *E03C 1/02* (2013.01);
(Continued)

(58) Field of Classification Search
CPC .... G05D 7/012; B05B 1/3006; B05B 12/088; E03C 1/02; E03C 1/084; F16K 31/002
(Continued)

(56) References Cited

U.S. PATENT DOCUMENTS 3,239,152 A * 3/1966 Bachli .................... E03C 1/084
239/428.5
4,000,857 A * 1/1977 Moen .................... B05B 1/3006
239/428.5
(Continued)

FOREIGN PATENT DOCUMENTS

DE        10228490      11/2003
DE       202011100800   10/2012
(Continued)

*Primary Examiner* — Steven J Ganey
(74) *Attorney, Agent, or Firm* — Volpe and Koenig, P.C.

(57) ABSTRACT

The invention relates to a sanitary insertion unit (1) with a flow regulator (2) that has a regulator housing (3) in which a first regulator unit (4) is provided. The first regulator unit has an annular channel (5) that surrounds a core (6) and in which an annular throttle element (7) made of an elastic material is arranged. The throttle element (7) delimits a control gap between the throttle element and a profiled regulating section (8) provided on an inner and/or outer channel wall, the passage cross-section of said gap being modifiable by the throttle element (7), which deforms under the effect of the pressure difference generated in the event of a flow. At least one inner second regulator unit (9) is provided in the core (6) of the first regulator unit (4), this second regulator unit (9) likewise having an annular channel (10) with an annular throttle element (12) which is made of an elastic material and is arranged in the annular channel, and the throttle element (12) delimits a control gap between the throttle element and a profiled regulating section (13). The insertion unit according to the invention is characterized in that the insertion unit (1) has a jet regulator (14) which has a cup-shaped jet splitter (16) in the jet regulator housing (15). The cub base of the jet splitter forms an impact surface (17) which deflects the water coming from the regulator units (4, 9) outwards transversely to the jet regulator longitudinal axis towards passage openings (18) in the circumferential wall of the cup-shaped jet splitter (16). The insertion unit according to the invention is characterized in that
(Continued)

the insertion unit can achieve a good aeration and a good mixture of the fluid with the surrounding air even with a low pressure of the through-flowing fluid.

21 Claims, 3 Drawing Sheets

(51) Int. Cl.
    *E03C 1/02*     (2006.01)
    *E03C 1/084*     (2006.01)
    *F16K 31/00*     (2006.01)
    *B05B 1/30*     (2006.01)
    *B05B 12/08*     (2006.01)

(52) U.S. Cl.
    CPC ............ *E03C 1/084* (2013.01); *F16K 31/002* (2013.01); *B05B 1/30* (2013.01); *F16K 31/001* (2013.01); *G05D 7/01* (2013.01)

(58) Field of Classification Search
    USPC ...... 239/428.5, 419.5, 533.1, 570, 571, 575; 138/46
    See application file for complete search history.

(56) References Cited

U.S. PATENT DOCUMENTS

| | | | | |
|---|---|---|---|---|
| 4,221,335 | A | * | 9/1980 | Shames ................ B05B 1/00 138/46 |
| 5,071,071 | A | * | 12/1991 | Chao ................ E03C 1/084 239/428.5 |
| 5,114,072 | A | * | 5/1992 | Barhydt, Sr. ............ E03C 1/08 239/533.1 |
| 2006/0169330 | A1 | | 8/2006 | Hart |
| 2012/0325933 | A1 | | 12/2012 | Blum |
| 2014/0332097 | A1 | | 11/2014 | Twitchett |

FOREIGN PATENT DOCUMENTS

| | | |
|---|---|---|
| WO | 2004003673 | 1/2004 |
| WO | 2004083699 | 9/2004 |
| WO | 2011098253 | 8/2011 |
| WO | 2012156002 | 11/2012 |

\* cited by examiner

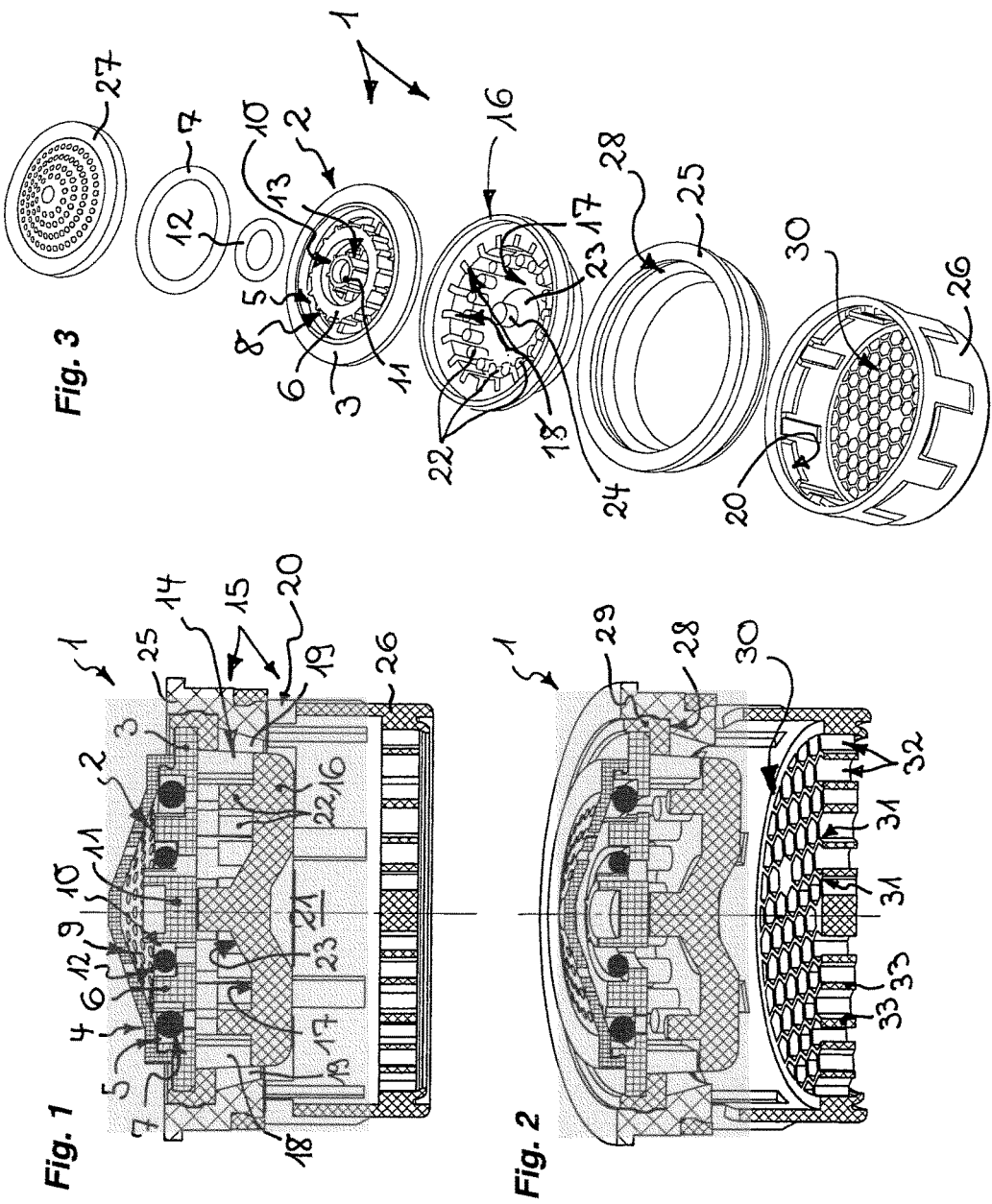

SANITARY INSERTION UNIT

BACKGROUND

The invention relates to a sanitary insertion unit having a flow regulator, which flow regulator comprises a regulator housing, in which regulator housing there is provided a first regulator unit, which first regulator unit has a ring-shaped duct, which ring-shaped duct encompasses a core and in which ring-shaped duct a ring-shaped throttle body produced from elastic material is arranged, which throttle body delimits a control gap between itself and a regulating profiling which is provided on an inside and/or outside channel wall, the passage cross section of which control gap is modifiable by way of the throttle body which deforms under the pressure difference that forms when a flow passes through, wherein in the core of the first regulator unit there is provided at least one inside second regulator unit which has a ring-shaped duct with a ring-shaped throttle body produced from elastic material arranged therein, which throttle body delimits a control gap between itself and a regulating profiling.

A sanitary insertion unit realized as a flow regulator of the type mentioned in the introduction has already been disclosed in WO 2004/003673 A1, said sanitary insertion unit has a regulator housing which, in a passage duct, comprises the core of a first regulator unit, which is surrounded by a ring-shaped throttle body produced from elastic material, which throttle body delimits, between itself and the core or the housing outside circumference, a control gap, the passage cross section of which is modifiable by way of the throttle body which deforms under the pressure difference that forms when a flow passes through. In order then to also be able to utilize a comparatively large line cross section in an optimum manner and in order to create a precisely regulating flow regulator, the previously known flow regulator comprises a further second, similarly designed regulator unit in the region of the first regulator unit. The flow regulator disclosed in WO 2004/003673 A1 may duly also utilize a comparatively large cross section in order to regulate the flow rate there to a fixed maximum value, but in the presence of relatively low pressures, the disclosed flow regulator is neither able to achieve an additional water-saving effect nor is the previously known flow regulator suitable for improving the jet pattern of the emerging water jet.

A sanitary insertion unit which has a flow regulator has already been disclosed in WO 2012/156002 A1. The flow regulator provided in the disclosed insertion unit also comprises an elastic throttle body which, between itself and a regulating profiling, delimits a control gap which is modifiable under the pressure of the throughflowing water. Since such an elastic throttle body always requires a certain water pressure before it begins to deform to regulate the flow rate, and since the elastic throttle body also constricts the flow cross section of the insertion unit in the presence of low water pressures, a shut-off valve is also provided in the regulator housing of the disclosed insertion unit, the valve body of which shut-off valve is, in the presence of increasing water pressure, movable from an open position into a closed position counter to the inherent elasticity of the material used for the valve body. The object of the additional closing valve is, in the presence of low connection pressure, to create an additional liquid passage which ensures a rapid increase in the flow rate up to the desired maximum value when the pressure increases. However, said disclosed insertion unit is also not able to significantly improve the jet quality of the emerging water jet in the presence of low pressures.

Finally, EP 1 604 137 B1 discloses a flow regulator which is realized as an insertion part which is insertable into a gas or liquid line and which has a housing, in the housing interior of which housing there is arranged at least one throttle or regulator body which, between itself and a housing wall, delimits a regulating gap which is modified in a pressure-dependent manner, the housing being composed of at least two housing parts, and a housing part seal, which is integrally connected to the at least one throttle or regulator body mounted in the housing interior, being provided between those sides of the two adjacent housing parts which face one another. In this case, an embodiment of said disclosed flow regulator provides that the installation part is also realized as a check valve and that the housing parts seal is integrally connected for this purpose to at least one closing body, which closing body is movably arranged in the housing interior and is realized as a ring-shaped diaphragm which is movable inside the housing chamber by the medium to be delivered.

SUMMARY

Consequently, the object is in particular to create a sanitary insertion unit of the type mentioned in the introduction which, even in the presence of low pressures of the throughflowing fluid, is capable of significantly improving the jet quality of said fluid.

The object is achieved according to the invention with the sanitary insertion unit of the type mentioned in the introduction in particular in that the insertion unit has a jet regulator, which comprises in its jet regulator housing a pot-shaped jet splitter, the pot base of which forms an impingement surface which diverts the water coming from the regulator units outwardly transversely with respect to the jet regulator longitudinal axis toward passage openings in the circumferential wall of the pot-shaped jet splitter.

The insertion unit according to the invention, which is mountable on the water outlet of a sanitary outlet fitting, comprises a flow regulator which has a regulator housing in which a first outside regulator unit is provided. Said first regulator unit has a ring-shaped duct which encompasses a core and in which a ring-shaped throttle body produced from elastic material is arranged. The throttle body delimits, between itself and a regulating profiling, a control gap which is provided on an inside and/or outside channel wall, the flow cross section of which control gap is modifiable by way of the throttle body which deforms under the pressure difference that forms when a flow passes through. With increasing water pressure, the elastic throttle body forms into the regulating profiling associated with it and constricts the control gap in such a manner that the flow regulator regulates the water quantity flowing through per unit of time to a fixed value. At least one inside regulator unit is provided in the core of the first outside regulator unit, each inside regulator unit being realized correspondingly in comparison with the outside regulator unit and also having a ring-shaped duct with a ring-shaped throttle body provided therein, which throttle body delimits a control gap between itself and a regulating profiling that is provided on an inside and/or outside channel wall, the passage cross section of which control gap is modifiable by way of the throttle body which deforms under the pressure difference that forms when a flow passes through. The water flowing through the insertion unit according to the invention experiences an increase in speed as early as in the ring-shaped ducts of the first and of the at least one second regulator unit. The water flowing through here at a comparably faster speed flows in the direction of a jet regulator of the insertion unit, which comprises a pot-shaped jet splitter in its jet regulator housing. In this case, the pot base of the jet splitter forms an impingement surface which diverts the water coming from the regulator units outward transversely with respect to the jet regulator longitudinal axis toward passage openings in the circumferential wall of the pot-shaped jet splitter. The water flowing onto the impingement surface at high speed is braked there, is diverted and is guided outward transversely with respect to the jet regulator longitudinal axis toward passage openings which are arranged in the circumferential wall of the pot-shaped jet splitter. If the water flowing through the passage openings does not then flow onward as a ring-shaped wall formed from water, the water can also be divided in said passage openings into individual jets which flow through the passage openings at a further increased speed. According to Bernoulli's equation, with every increase in speed which is brought about by a ring-shaped duct, a passage opening or a similar cross-sectional constriction, negative pressure is generated on the outflow side. Since the water flowing through the insertion unit according to the invention experiences such a speed increase multiple times, a comparatively high useful negative pressure is generated in the insertion unit according to the invention even in the presence of low water pressures. Since the throttle bodies provided in the ring-shaped ducts of the regulator units, compared to one single, larger-dimensioned regulator unit, respond and deform even at low pressure, a disruptive peak in the curve progression of the flow line is avoided, as is customary, by contrast, with larger flow regulators with one correspondingly wide ring-shaped duct. The insertion unit according to the invention consequently distinguishes itself in that it is able to significantly improve the jet quality of the water jet emerging out of the jet regulator even in the presence of low pressures of the throughflowing fluid.

In order to be able to utilize the negative pressure generated even in the presence of low pressures in the insertion unit according to the invention in an advantageous manner, a preferred refinement according to the invention provides that the jet regulator of the insertion unit according to the invention is realized as an aerated jet regulator.

A preferred embodiment according to the invention provides, for this purpose, that the jet regulator has at least one aeration opening in the housing circumferential wall of its jet regulator housing, which aeration opening preferably opens out in the housing interior of the jet regulator housing beneath the passage openings of the jet splitter in the direction of flow. The negative pressure formed on the downstream side of the jet splitter can draw surrounding air into the housing interior of the jet regulator housing through said aeration opening, said surrounding air being mixed there with the water flowing through the insertion unit such that a homogeneous, non-spraying and sparkling soft water jet is created.

A preferred refinement according to the invention provides that a ring-shaped zone, which tapers increasingly in the direction of flow, is provided in the region of the outflow-side mouths of the passage openings, between the outer circumferential wall of the jet splitter and the adjacent housing inner circumference of the jet regulator housing. In said ring-shaped zone, which tapers in the direction of flow, the fluid flowing through either in individual jets or in a ring-shaped jet experiences a further increase in speed which generates negative pressure below said ring-shaped zone, by means of which negative pressure surrounding air can be drawn into the housing interior of the jet regulator housing. A mixing zone, in which the water and the incoming surrounding air can be thoroughly mixed, is consequently generated below said ring-shaped zone.

So that the surrounding air is able to be introduced in an unobstructed manner in said mixing zone, a preferred embodiment according to the invention provides that the at least one aeration opening is provided in the housing wall of the jet regulator housing in the region of the ring-shaped zone and in particular beneath the ring-shaped zone in the direction of flow of the fluid flowing through the jet regulator.

The pot-shaped jet splitter in the jet regulator of the insertion unit according to the invention comprises a central impingement surface against which the water coming from the regulator units is decelerated and diverted. In order to even further promote deceleration of the water striking the diversion plate, a preferred refinement according to the invention provides that a flow obstruction is provided upstream of at least one of the passage openings in the direction of flow.

In this case, it is expedient if the at least one flow obstruction is of pin-like form and protrudes on the inside of the pot base of the jet splitter in the opposite direction to the direction of flow.

In this case, one embodiment is preferred where the flow obstructions are arranged such that at least a partial quantity of the water coming from the flow regulator and in particular the water quantity coming from the outside regulator unit strikes the pot base of the jet splitter once the maximum flow rate between the flow obstructions has been reached. In this way, it is achieved that the water, which flows in at a particularly fast speed in particular when the maximum value of the flow rate is achieved, is able to be decelerated in an effective manner at the impingement surface of the pot base of the jet splitter and at the flow obstructions arranged there.

In order to even further promote the diverting of the water coming from the regulator units in the region of the pot base of the jet splitter, it is advantageous if a central diverting cone is provided on the pot base of the jet splitter, and if at least one inside control gap is aligned such that at least a partial quantity of the water emerging there strikes the diverting cone.

A particularly stable embodiment of the insertion unit according to the invention, which also withstands high water pressures, provides that a central retaining pin, against which the flow regulator is supported preferably approximately centrally, protrudes above the central diverting cone.

A particularly compact and space-saving embodiment which can be inserted easily into an outlet mouthpiece that can be mounted on the water outlet of an outlet fitting provides that the regulator housing is supported on a ring-shaped shoulder of the jet regulator housing.

A particularly advantageous and easily producible embodiment according to the invention provides that the jet regulator housing is of two-part form and that the aeration openings provided in an outflow-side housing part extend as far as below the parting plane between the housing parts.

In order that the water flowing through the insertion unit according to the invention can be formed into a homogeneous and non-spraying water jet again on the outlet side, it is advantageous if a grid structure or mesh structure formed by webs which cross at crossing nodes and which between them border outlet openings is provided on the outlet-side end face of the outflow-side housing part. In this case, on the outlet-side end face, there may also be provided a non-ordered grid structure or a grid structure in which the webs that cross one another between them delimit honeycomb-shaped outlet openings.

The simple design and production of the insertion unit according to the invention is even further promoted if the grid structure or mesh structure is integrally formed in unipartite fashion on the outflow-side housing part.

In each case one elastic throttle body may be provided in the first regulator unit and in the at least one second regulator unit. It is however also possible for the throttle body of the first regulator unit and the throttle body of at least the adjacent second regulator unit to be connected to one another preferably in unipartite fashion to form a throttle body unit. In the case of this particularly advantageous embodiment, at least two adjacent regulator units are assigned a common throttle body unit, wherein the throttle bodies situated in the ring-shaped grooves of said regulator units are connected to one another to form a single throttle body unit.

The first outer regulator unit, on the one hand, and the at least one inside second regulator unit, on the other hand, may be arranged with a greater or lesser eccentricity with respect to one another. A preferred embodiment according to the invention which can be designed in a particularly space-saving manner however provides that the ring-shaped groove of the first regulator unit and that of the adjacent second regulator unit are arranged concentrically with respect to one another.

A particularly advantageous refinement according to the invention, in which the throttle bodies assigned to the adjacent regulator units can be produced in a particularly simple manner, provides that the throttle body unit comprises an approximately W-shaped, Y-shaped or fork-shaped ring cross section and that two free web ends of said ring cross section form the ring-shaped throttle bodies of the two adjacent regulator units.

In order that the by two free web ends of the throttle body unit of W-shaped, Y-shaped or fork-shaped form in the ring cross section can be arranged concentrically in the ring-shaped grooves of the adjacent regulator units in a simple manner, if appropriate even in an automated production process, it is advantageous if the ring-shaped groove of the first regulator unit and the ring-shaped groove of the adjacent second regulator unit are separated from one another by an encircling ring-shaped wall or by a ring-shaped groove.

In an embodiment in which the ring-shaped grooves of the adjacent regulator units are separated from one another by an interposed ring-shaped wall, it is advantageous if the ring-shaped wall which protrudes on the inflow-side end face of the regulator housing protrudes into the central recess of the W-shaped ring cross section of the throttle body unit.

In an embodiment in which a further ring-shaped groove is, by contrast, provided between the ring-shaped grooves of the adjacent regulator units, it is expedient if the Y shape or the fork shape of the throttle body unit is held in the ring-shaped groove which is provided on the inflow-side end face of the regulator housing and which is arranged between the ring-shaped grooves of the adjacent regulator units.

In order to coordinate the regulating characteristics of the flow regulators provided in a flow regulator unit with one another and for example configure these such that one flow regulator unit imparts regulation primarily in the lower pressure range, whereas, by contrast, the other flow regulator unit has the task of imparting regulation more in the upper pressure range, it may be advantageous if at least two free web ends of said W-shaped, Y-shaped or fork-shaped throttle body unit differ from one another in terms of their material-related and/or shape-related elasticity.

Refinements of the invention will emerge from the following description in conjunction with the claims, and from the drawing. Below, the invention will be described in yet more detail on the basis of a preferred exemplary embodiment.

BRIEF DESCRIPTION OF THE DRAWINGS

In the drawing:

FIG. 1 shows, in a longitudinal sectional illustration, a sanitary insertion unit which can be mounted, with the aid of an outlet mouthpiece, on the water outlet of a sanitary water outlet fitting, wherein the insertion unit has an inflow-side upstream or filter screen, an outflow-side jet regulator and a flow regulator which is arranged between the upstream screen and jet regulator and which has two preferably concentric regulator units, FIG. 2 shows, in a perspective longitudinal sectional illustration, the sanitary insertion unit from FIG. 1 in a view directed toward the inflow side of said insertion unit, FIG. 3 shows the insertion unit from FIGS. 1 and 2 in an exploded perspective illustration of its constituent parts.

DETAILED DESCRIPTION OF THE PREFERRED EMBODIMENTS

Figure 4:
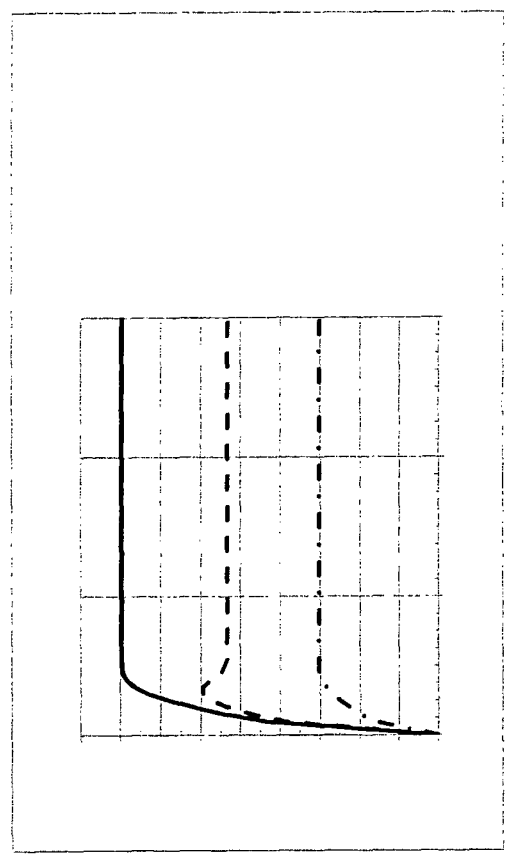
FIG. 4 shows the flow rate, regulated by the flow regulator of the insertion unit shown in FIGS. 1 to 3, as a function of the pressure of the inflowing water.
Figure 8:
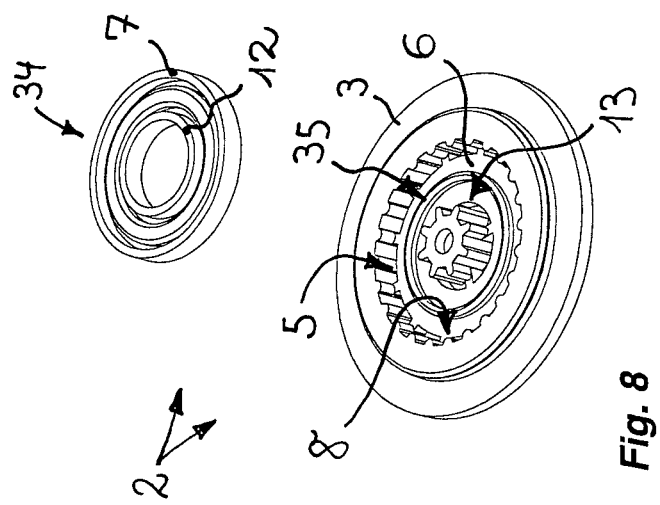
FIG. 8 shows the flow regulator from FIGS. 5 to 7 in an exploded illustration of regulator housing and associated throttle body unit.
Figure 7:
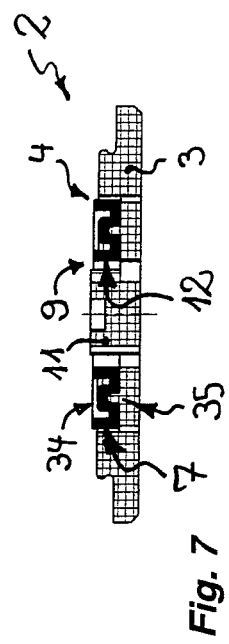
FIG. 7 shows the flow regulator from FIGS. 5 and 6 in a longitudinally sectioned side view.
Figure 6:
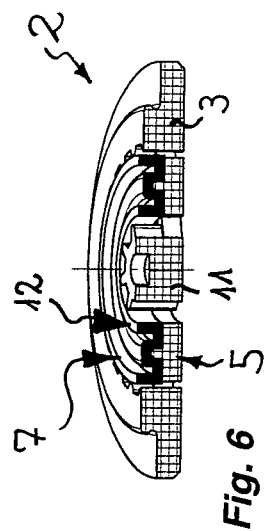
FIG. 6 shows the flow regulator from FIG. 5 in a perspective longitudinal section.
Figure 5:
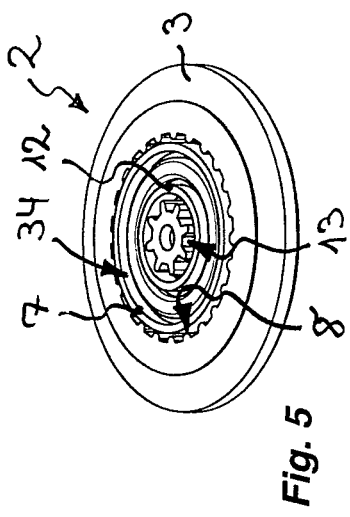
FIG. 5 shows, in a perspective plan view of the inflow side, a flow regulator designed for use in the sanitary insertion unit, which flow regulator, in relation to the flow regulator used in FIGS. 1 to 4, duly likewise has two preferably concentric regulator units but is designed differently therefrom and, in this case, has a common throttle body unit which is approximately W-shaped in ring-shaped longitudinal section, wherein the free web ends of said W shape form the throttle bodies of the two regulator units.

FIGS. 1 to 3 illustrate a sanitary insertion unit 1 which can be mounted on the water outlet of a sanitary outlet fitting (not shown in any more detail here). The insertion unit 1 has a flow regulator 2 which has a regulator housing 3 in which a first regulator unit 4 is provided. Said outside or outer first regulator unit 4 has a ring-shaped duct 5 which encompasses a core 6 and in which there is arranged a ring-shaped throttle body 7 composed of elastic material. The throttle body 7 delimits a control gap between itself and a regulating profiling 8 provided on an inside and/or outside duct wall, the passage cross section of which control gap is modifiable by way of the throttle body 7 which deforms under the pressure difference that forms when a flow passes through. With increasing water pressure, the elastic throttle body 7 forms into the regulating profiling 8 associated with it and constricts the control gap in such a manner that the flow regulator 2 regulates the water quantity flowing through per unit of time to a fixed value. At least one inside regulator unit 9 is provided in the core 6 of the first outside regulator unit 4, said inside regulator unit 9 being realized correspondingly in comparison with the outside regulator unit 4. The inside regulator unit 9 also has a ring-shaped duct 10 which encompasses a core 11 and in which there is arranged a ring-shaped throttle body 12 composed of elastic material. The throttle body 12 of the inner regulator unit 9 also delimits a control gap between itself and a regulating profiling 13 that is provided on an inside and/or outside channel wall, the passage cross section of which control gap is modifiable by way of the throttle body 12 which deforms under the pressure difference that forms when a flow passes through.

The water flowing through the insertion unit 1 experiences an increase in speed as early as in the ring-shaped ducts 5, 10 of the regulator units 4, 9. This water flowing through at high speed flows in the direction of a jet regulator 14 of the insertion unit 1, which comprises a pot-shaped jet splitter 16 in its jet regulator housing 15. In this case, the pot base of the jet splitter 16 forms an impingement surface 17 which diverts the water coming from the regulator units 4, 9 outward transversely with respect to the jet regulator longitudinal axis toward the passage openings 18 in the circumferential wall of the pot-shaped jet splitter 16. The water flowing onto the impingement surface 17 at high speed is braked there, is diverted and is guided outward transversely with respect to the jet regulator longitudinal axis toward passage openings 18 which are arranged in the circumferential wall of the pot-shaped jet splitter 16. In said passage openings 18, the water may possibly also be split up into individual jets, wherein either said individual jets or instead a ring-shaped wall formed from the throughflowing water flow(s) through the passage openings 18 at a further increased speed. According to Bernoulli's equation, with every increase in speed which is brought about by the ring-shaped ducts 5, 10 of the regulator units 4, 9, the passage openings 18 in the jet splitter 16 or similar cross-sectional constrictions, negative pressure is generated on the outflow side. Since the water flowing through the insertion unit 1 experiences such a speed increase multiple times, a comparatively high useful negative pressure is generated in the insertion unit 1 even in the presence of low water pressures. Since the throttle bodies 7, 12 provided in the ring-shaped ducts 5, 10 of the regulator units 4, 9, compared to one single, larger-dimensioned regulator unit, respond and deform even at low pressure, a disruptive peak in the curve progression of the flow line is avoided, as is customary, by contrast, with larger flow regulators with only one correspondingly wide ring-shaped duct.

The jet regulator 14 of the insertion unit 1 is in the form of an aerated jet regulator. The jet regulator 14 has a ring-shaped zone 19, which tapers increasingly in the direction of flow, in the region of the outflow-side mouths of the passage openings 18, between the outer circumferential wall of the jet splitter 16 and the adjacent housing inner circumference of the jet regulator housing 15 of said jet regulator. In the region of said ring-shaped zone 19, the water flowing through the ring-shaped zone 19 either in individual jets or in a ring-shaped wall experiences a further increase in speed which generates negative pressure on the outflow side of the ring-shaped zone 19. At least one aeration opening 20 is provided in the housing wall of the jet regulator housing 15 beneath the ring-shaped zone 19 in the flow direction of the fluid flowing through the jet regulator 14. By way of the negative pressure that is generated even in the presence of relatively low pressures as a result of the multiple increases in speed of the throughflowing water, it is possible for ambient air to be drawn into the housing interior of the jet regulator housing 15 through the aeration openings 20, which ambient air is mixed, in a mixing zone 21, arranged below the jet splitter 16, in the jet regular housing 15 with the throughflowing water.

In order that the water already flowing in from the regulator units 4, 9 at high speed is not perceived by the user as a hard water jet, the water flowing in from the flow regulator 2 is braked and diverted already on the impingement surface 17 of the jet splitter 16. To realize an additional braking action of the water flowing onto the impingement surface, at least one flow obstruction 22 is provided upstream of the passage openings 18 in the flow direction. The flow obstructions 22, which are in this case circular and arranged at uniform intervals with respect to one another, are of pin-shaped form and protrude on the inside of the pot base of the jet splitter 16. Here, said pin-shaped flow obstructions 22 are arranged in such a way that the water quantity coming from the outside regulator unit 4 strikes the pot base, which serves as impingement surface 17, of the jet splitter 16 once the maximum flow rate of said regulator unit 4 between the flow obstructions 22 has been reached.

In the longitudinal sections in FIGS. 1 and 2, it can be clearly seen that a central diverting cone 23 is provided on the pot base, which serves as impingement surface 17, of the jet splitter 16. Here, the ring-shaped duct 10, which extends through the regulator housing 3, of the at least one inside regulator unit 9 is aligned such that the water emerging there strikes the diverting cone 23 before being diverted from there likewise to the passage openings 18. A central retaining pin 24, against which the flow regulator 2 is supported approximately centrally, protrudes above the central diverting cone 23.

In FIGS. 1 to 3, it can be seen that the jet regulator housing 15 is formed in two parts and has an inflow-side housing part 25 and an outflow-side housing part 26. Here, the aeration openings 20 provided in the outflow-side housing part 26 extend as far as below the parting plane between the housing parts 25 and 26.

The insertion unit 1 has an in this case, an upstream or filter screen 27 of conical form, between which and the jet regulator 15 the flow regulator 2 is arranged. The regulator housing 3 of the flow regulator 2 is supported on a ring-shaped shoulder 28 on the inflow-side housing part 25 of the jet regulator housing 15. Here, the regulator housing 3 is placed into a cross-sectional approximately L-shaped section of the jet splitter 16 in which the transverse web of said L shape is angled radially inward. The regulator housing 3 is held in releasable and in particular releasably latchable fashion in the jet splitter 16. The jet splitter 16 lying on the ring-shaped shoulder 28 is in turn mounted in preferably releasable and in particular releasably latchable fashion on the inner circumference of the inflow-side housing part 25. The housing parts 25 and 26 that form the jet regulator housing 15 are also fitted into one another in releasable and in particular releasably latchable fashion.

A grid or mesh structure 30 formed by webs 33 which cross at crossing nodes 31 and which between them border outlet openings 32 is provided on the outlet-side end face of the outflow-side housing part 26. Said grid or mesh structure 30, which is intended to promote the formation of a homogeneous, non-spraying and sparkling soft water jet in the insertion unit 1 illustrated here, is integrally formed in unipartite fashion on the housing part 26.

FIG. 4 illustrates the flow rate regulated by the flow regulator 2 of the insertion unit 1 as a function of the pressure of the inflowing water. Here, the solid line shows the flow rate of the flow regulator 2 composed of the regulator units 4, 9, with this being plotted alongside the flow rate of the inside regulator unit 9, shown by the bottom dash-dotted line, and the flow rate of the outside regulator unit 4, shown by the dashed line in between. It is clear from FIG. 4 that the flow rate of the relatively large, outside regulator unit 4 may, in a certain pressure range in which the throttle body begins to deform, even exceed the desired maximum value in a so-called "peak". By contrast, the flow regulator 2 which is used in the insertion unit 1 and which is composed of an outside regulator unit 4 and at least one inside regulator unit 9 is characterized by a rapid increase in flow rate, wherein an undesired exceedance of the set maximum value of the flow rate is substantially avoided.

FIGS. 5 to 8 illustrate an alternative embodiment for a flow regulator 2, such as may be used in the sanitary insertion unit 1 as per FIGS. 1 to 4. As can be seen from the longitudinal sections in FIGS. 6 and 7, the throttle body 7 of the outer, first regulator unit 4 and the throttle body 12 of the adjacent, second regulator unit 9 are connected to one another preferably in unipartite fashion to form a throttle body unit 34. Here, said throttle body unit 34 has an in this case approximately W-shaped ring cross section, wherein the free web ends of said ring shape form the ring-shaped throttle bodies 7, 12. Here, the ring cross section refers to a section plane arranged approximately perpendicular to the plane running through the ring circumference. To coordinate the regulating characteristics of the outer, first regulator unit 4 and of the inside, second regulator unit 9 with one another, and for example configure said regulating characteristics such that one flow regulator unit imparts regulation primarily in the lower pressure range, whereas, by contrast, the other flow regulator unit has the task of imparting regulation in the upper pressure range, it is possible for the at least two free web ends of said throttle body unit 34 of approximately W-shaped ring cross section to differ from one another in terms of their material-related and/or shape-related elasticity.

Since the ring-shaped duct 5 of the outer, first regulator unit 4 and the ring-shaped duct 10 of the adjacent, second regulator unit 9 are in this case separated from one another by an encircling ring-shaped wall 35 which protrudes on the inflow-side end face of the regulator housing 3 into the central recess of the in this case W-shaped ring cross section of the throttle body unit 34, and since said ring-shaped wall 35 protrudes into the central recess of the W-shaped ring cross section of the throttle body unit 34, the arrangement of the throttle body unit 34 in the correct position in the ring-shaped duct 5, 10 is ensured. From a comparison of FIGS. 5 to 8, it can be seen that the throttle body 7 which protrudes in the manner of a lip on the throttle body unit 34 interacts with a regulating profiling 8 which is provided on the outside duct wall of the ring-shaped duct 15, whereas, by contrast, the throttle body 12 which is in this case likewise formed in the manner of a lip on the throttle body unit 34 interacts with a regulating profiling 13 which is arranged on the inside duct wall of the ring-shaped duct 10. Since the throttle bodies 7, 12 of the regulator units 4, 9 are connected in unipartite fashion to form a throttle body unit 34 produced from elastic material, the possibly even automated production of the flow regulator 2 required for the insertion unit 1 is greatly simplified.

LIST OF REFERENCE DESIGNATIONS

1 Insertion unit
2 Flow regulator
3 Regulator housing
4 Outside regulator unit
5 Ring-shaped duct (of the outside regulator unit 4)
6 Outer core (of the outside regulator unit 4)
7 Throttle body (of the outside regulator unit 4)
8 Regulating profiling (of the outside regulator unit 4)
9 Inside regulator unit
10 Ring-shaped duct (of the inside regulator unit 9)
11 Inner core (of the inside regulator unit 9)
12 Throttle body (of the inside regulator unit 9)
13 Regulating profiling (of the inside regulator unit 9)
14 Jet regulator
15 Jet regulator housing
16 Jet splitter
17 Impingement surface
18 Passage openings
19 Ring-shaped zone
20 Aeration openings
21 Mixing zone
22 Flow obstructions
23 Central diverting cone
24 Central retaining pin
25 Inflow-side housing part
26 Outflow-side housing part
27 Upstream or filter screen
28 Ring-shaped shoulder
30 Grid structure
31 Crossing node
32 Outlet openings
33 Webs
34 Throttle body unit
35 Ring-shaped wall

The invention claimed is:

1. A sanitary insertion unit (1) comprising a flow regulator (2), said flow regulator comprises a regulator housing (3), a first regulator unit (4) is provided in the regulator housing, said first regulator unit has a ring-shaped duct (5) which encompasses a core (6), and a ring-shaped throttle body (7) produced from elastic material is arranged in said ring-shaped duct, said throttle body (7) delimits a control gap between itself and a regulating profiling (8) which is provided on at least one of an inside or an outside channel wall, a passage cross section of said control gap is modifiable by way of the throttle body (7) which deforms under a pressure difference that forms when a flow passes through, wherein in the core (6) of the first regulator unit (4) there is provided at least one inside second regulator unit (9) which has a second ring-shaped duct (10) with a second ring-shaped throttle body (12) produced from elastic material arranged therein, said second throttle body (12) delimits a second control gap between itself and a regulating profiling (13), a jet regulator (14) having a jet regulator housing (15) in which a pot-shaped jet splitter (16) is located, a pot base of which forms an impingement surface (17) which diverts water coming from the regulator units (4, 9) outwardly transversely with respect to a jet regulator longitudinal axis toward passage openings (18) in a circumferential wall of the pot-shaped jet splitter (16).

2. The sanitary insertion unit as claimed in claim 1, wherein the jet regulator (14) is an aerated jet regulator.

3. The sanitary insertion unit as claimed in claim 2, wherein the jet regulator (14) has at least one aeration opening (20) which extends through the jet regulator housing (15).

4. The sanitary insertion unit as claimed in claim 1, wherein a ring-shaped zone (19), which tapers increasingly in a direction of flow, is provided in a region of outflow-side mouths of the passage openings (18), between the outer circumferential wall of the jet splitter (16) and an adjacent housing inner circumference of the jet regulator housing (15).

5. The sanitary insertion unit as claimed in claim 4, wherein at least one aeration opening (20) is provided in the housing wall of the jet regulator housing (15) in a region of the ring-shaped zone (19).

6. The sanitary insertion unit as claimed in claim 5, wherein the jet regulator housing (15) is of two-part form and the at least one aeration opening (20) provided in an outflow-side housing part (26) extends as far as below a parting plane between the housing parts (25, 26).

7. The sanitary insertion unit as claimed in claim 6, further comprising a grid structure or mesh structure (30) formed by webs (33) which cross at crossing nodes (31) and which between them border outlet openings (32) on an outlet-side end face of the outflow-side housing part (26).

8. The sanitary insertion unit as claimed in claim 7, wherein the grid structure or mesh structure (30) is integrally formed in unipartite fashion on the outflow-side housing part (26).

9. The sanitary insertion unit as claimed in claim 1, further comprising at least one flow obstruction (22) upstream of at least one of the passage openings (18) in a direction of flow.

10. The sanitary insertion unit as claimed in claim 9, wherein the at least one flow obstruction (22) protrudes on an inside of the pot base of the jet splitter (17) in an opposite direction to the direction of flow.

11. The sanitary insertion unit as claimed in claim 9, wherein the flow obstructions (22) are arranged such that at least a partial quantity of the water coming from the flow regulator (2) strikes the pot base of the jet splitter (17) inside a circular area bordered by the flow obstructions (22).

12. The sanitary insertion unit as claimed in claim 9, wherein the flow obstructions (22) are of pin-shaped.

13. The sanitary insertion unit as claimed in claim 1, wherein a central diverting cone (23) is provided on the pot base of the jet splitter (16), and the inside ring-shaped duct (10) is aligned such that at least a partial quantity of the water emerging there strikes the diverting cone (23).

14. The sanitary insertion unit as claimed in claim 13, wherein a central retaining pin (24), against which the flow regulator (2) is supported protrudes above the central diverting cone (23).

15. The sanitary insertion unit as claimed in claim 1, wherein the regulator housing (3) is supported on a ring-shaped shoulder (28) of the jet regulator housing (15).

16. The sanitary insertion unit as claimed in claim 1, wherein the throttle body (7) of the first regulator unit (4) and the second throttle body (12) of the adjacent second regulator unit (9) are connected to one another in unipartite fashion to form a throttle body unit (34).

17. The sanitary insertion unit as claimed in claim 16, wherein the throttle body unit (34) comprises an approximately W-shaped, Y-shaped or fork-shaped ring cross section and two free web ends of said ring cross section form the ring-shaped throttle bodies (7, 12).

18. The sanitary insertion unit as claimed in claim 17, wherein the ring-shaped duct (5) of the first regulator unit (4) and the second ring-shaped duct (10) of the adjacent second regulator unit (9) are separated from one another by an encircling ring-shaped wall (35) or by a ring-shaped groove.

19. The sanitary insertion unit as claimed in claim 18, wherein the ring-shaped wall (35) which protrudes on an inflow-side end face of the regulator housing (3) protrudes into a central recess of the W-shaped ring cross section of the throttle body unit (34).

20. The sanitary insertion unit as claimed in claim 18, wherein a lower longitudinal web of the Y-shaped or fork-shaped ring cross section of the throttle body unit protrudes into the ring-shaped groove provided on an inflow-side end face of the regulator housing (3).

21. The sanitary insertion unit as claimed in claim 1, wherein the ring-shaped duct (5) of the first regulator unit (4) and the second ring-shaped duct (10) of the adjacent second regulator unit (9) are arranged concentrically with respect to one another.

\* \* \* \* \*